May 22, 1923.
F. KRITZ
1,456,316
WINDSHIELD WIPER
Filed Aug. 6, 1921
2 Sheets-Sheet 1
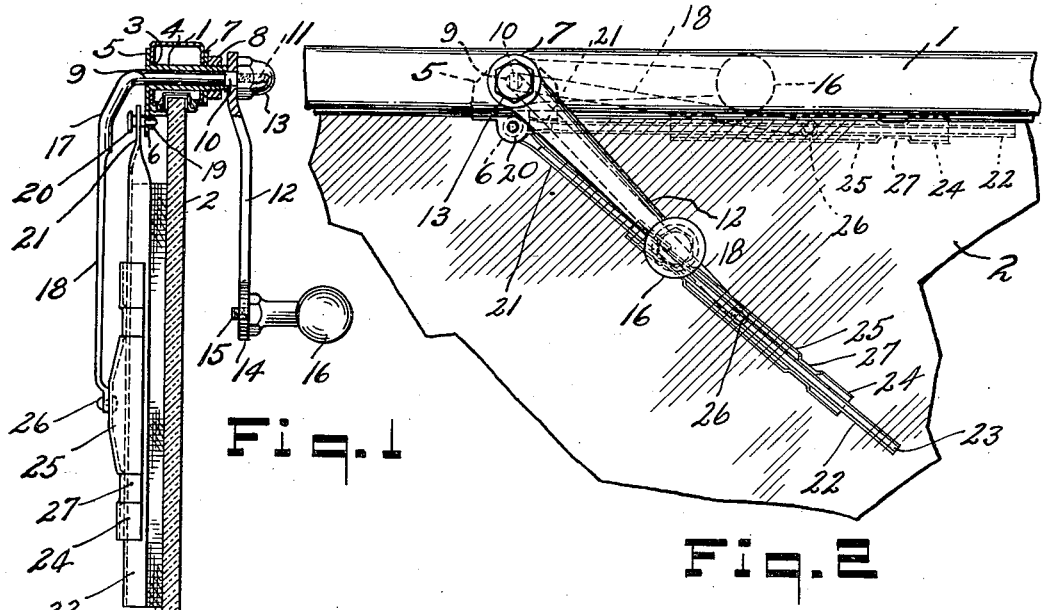
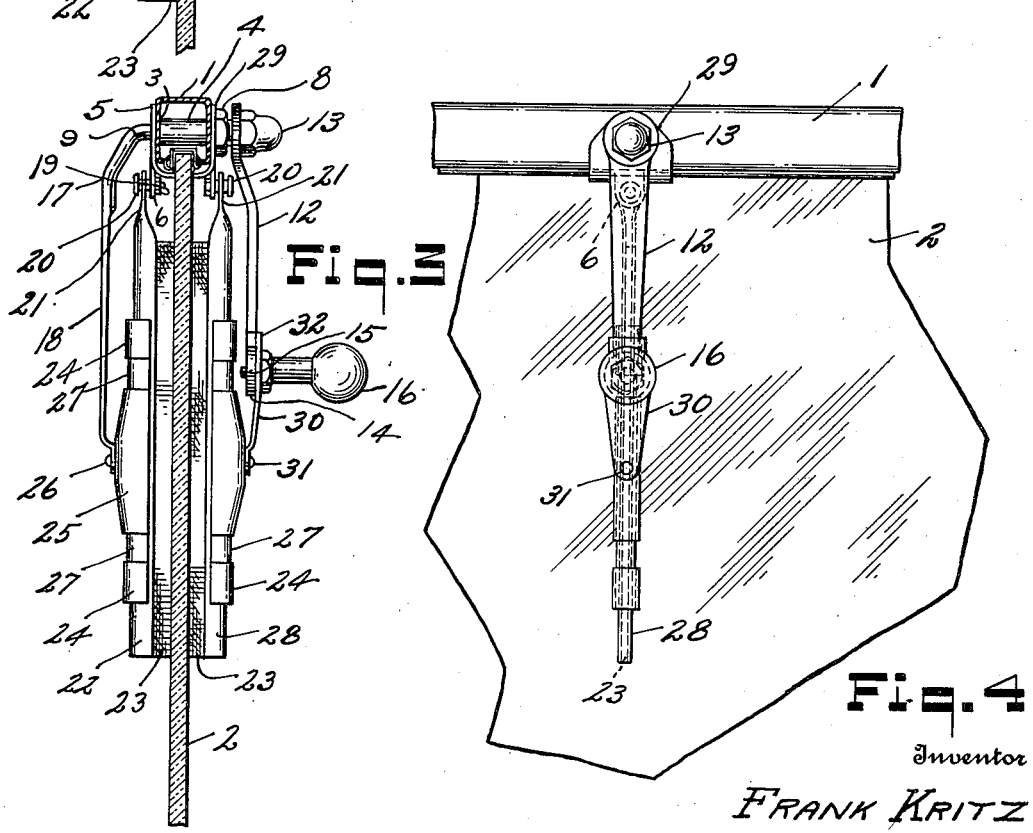
Inventor
FRANK KRITZ
By
Attorney May 22, 1923.

F. KRITZ

WINDSHIELD WIPER

Filed Aug. 6, 1921  2 Sheets-Sheet 2

1,456,316

Inventor
FRANK KRITZ
By [signature]
Attorney

Patented May 22, 1923.

1,456,316

UNITED STATES PATENT OFFICE.

FRANK KRITZ, OF DETROIT, MICHIGAN, ASSIGNOR TO KRITZ AND BAUER, OF DETROIT, MICHIGAN, A COPARTNERSHIP.

WINDSHIELD WIPER.

Application filed August 6, 1921. Serial No. 490,214.

*To all whom it may concern:*

Be it known that I, FRANK KRITZ, a citizen of the United States of America, residing at Detroit, in the county of Wayne and State of Michigan, have invented certain new and useful Improvements in Windshield Wipers, of which the following is a specification, reference being had therein to the accompanying drawings.

The primary object of my invention is to provide a windshield wiper or cleaning device that may be easily and quickly installed on the frame of a windshield and at any desired place thereon for wiping one or both faces of the windshield glass or transparent plate, so that rain, sleet, snow or foreign matter may be removed therefrom to afford a clear space for observation purposes.

Another object of this invention is to provide a windshield wiper including an oscillatory arm or wiper member that may be manually swung to clear a space on a windshield so that the operator or driver of an automobile or similar vehicle may readily make observations through the windshield and thus avoid accidents which have heretofore been the result of obstructed vision.

A further object of my invention is to provide a windshield wiper, which in one form may be mounted in a windshield frame, and in another form mounted on the frame. In the former arrangement the wiper includes two wiping arms or members which are maintained in frictional engagement with the front and rear faces of the windshield, and in the latter arrangement a single arm or member is operatably supported against the front face of the windshield and operatable from a point at the rear face of the windshield.

A still further object of my invention is to provide a windshield wiping device wherein the parts are constructed with a view of reducing the cost of manufacture and at the same time retaining those features by which durability and ease of operation are secured. The parts are also constructed with a view to avoid rattling or displacement during the operation of an automobile.

The above are a few of the objects attained by the forms of my invention which will be hereinafter described, and then claimed, and reference will now be had to the drawings, wherein—

Figure 1 is a side elevation of the windshield wiping device, partly in section, showing the device relative to a portion of the windshield;

Fig. 2 is a rear elevation of the same;

Fig. 3 is a view similar to Fig. 1, showing the device provided with two wiper arms;

Fig. 4 is a rear elevation of the same;

Figure 5:
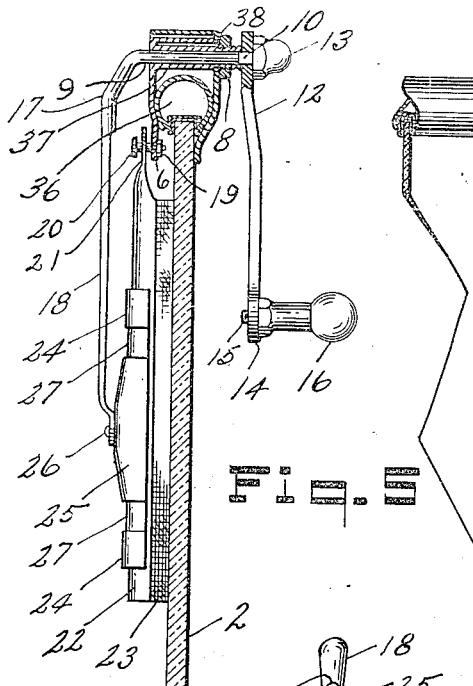
Fig. 5 is a side elevation of a windshield wiping device, partly in section, showing the device as an attachment for a windshield.
Figure 6:
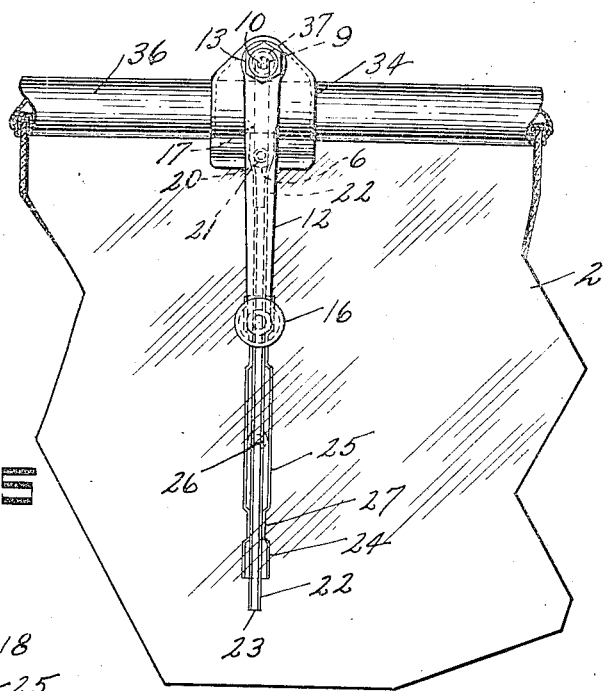
Fig. 6 is a rear elevation of the same.

Reference will first be had to Figs. 1 and 2 showing a portion of a conventional form of windshield which includes a hollow frame 1 and a plate of glass 2. The frame 1 is provided with a transverse opening 3 and mounted in said opening is a sleeve 4 having its forward end provided with a fixed clamping member 5 which has a depending lug 6. The rear end of the sleeve 4 is screwthreaded and on said sleeve, against the frame 1 is a washer 7 which is retained against said frame by a nut 8 screwed on said sleeve, said nut, the washer 7 and the clamping member 5 cooperating in clamping the sleeve 4 in the opening 3 of the frame 1, so that said sleeve may serve as a bearing without any danger of displacement relative to the windshield frame.

Journaled in the bearing sleeve 4 is a rock shaft 9 which has its rear or inner end provided with a rectangular portion 10 and a screwthreaded stem 11. Mounted on the rectangular portion 10 of the rock shaft is the end of a crank 12 which is retained in engagement with the rock shaft for oscillating said shaft by a cap or nut 13 screwed upon the stem 11 of the rock shaft. The lower or outer end of the crank 12 has an apertured head 14 and connected thereto is a screwthreaded stem 15 of a suitable handle 17, which may be gripped to swing the crank 12 in an arc and rock or oscillate the shaft 9.

The forward end of the shaft 9 has a bent portion 17 and a reduced depending end portion 18 and this end of the shaft is reduced in order to lend resiliency to the same, so that the end of the shaft may be sprung to provide the action of a compression spring or member for a purpose that will hereinafter appear.

Figure 7:
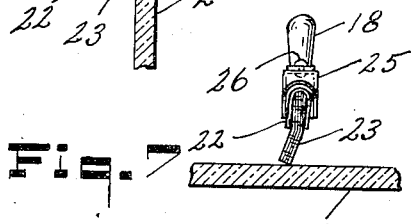
Fig. 7 is an end view of the wiper arm.
Figure 8:
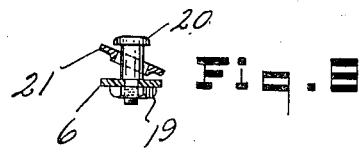
Fig. 8 is a detail sectional view of a loose connection adapted to form part of the wiping device.
Figures 9, 10:
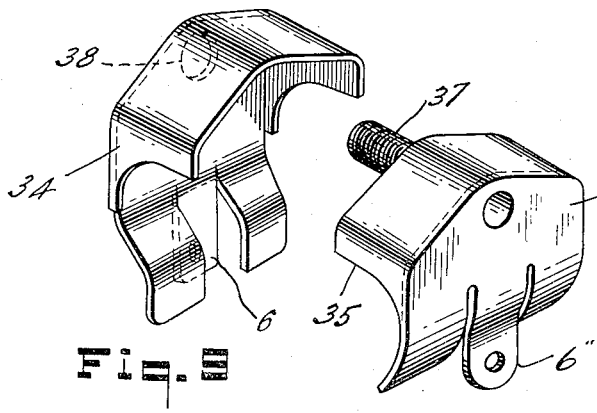
Figs. 9 and 10 are perspective views of clamping members adapted to form part of the wiping device shown in Figs. 5 and 6.

Suitably connected to the depending lug 6 of the clamping member 5, preferably by a nut 19 as shown in Fig. 8, is a headed pin 20 and loosely mounted on this pin is the upper apertured twisted end 21 of a channel shaped wiper arm 22 in which is mounted a flexible wiper, scraper or cleaning member 23 that may be made of felt, rubber, leather or any suitable material that will bear against the plate of glass 2, as shown in Fig. 7, and cleanse or remove matter from the face of the plate of glass. The wiper 23 is disposed longitudinally of the arm 22 and is preferably flexed in order that its wiping edge may swing from one side of the plane of the arm 22 to the opposite side of said plane, as said arm is swung in an arc, back and forth, against the face of the plate of glass 2. The wiper is caused to have a wiping or dragging action against the plate of glass so that first one edge thereof and then the other edge of said wiper will be brought into action.

Channel wiper arm 22 is slidably mounted in a channel holder 24, said holder having a central enlarged portion 25 pivotally connected, as at 26 to the lower end portion 18 of the rock shaft 9. The holder 24 also has restricted or contracted portions 27, adjacent the ends thereof, providing bearings or fulcrum points for the side walls of the arm 22, and the arm 22 may slide on these restricted portions or it may be held to have a slight rocking movement in the holder so that independent of the flexibility of the wiper 23, first one edge of the wiper and then the other will be presented for wiping purposes against the plate of glass. In view of the fact that the wiper arm 22 may have such action relative to the holder 24, the upper twisted end 21 of the wiper arm has been loosely mounted on the pin 20.

The depending lug 6 is below the windshield frame 1 and consequently the wiper arm 22 may be swung substantially into parallel relation with the frame 1, and when in such position not interfere with vision through the plate of glass 2. Movement is imparted to the wiper arm by the rock shaft 9 and the forward end of this shaft will constantly hold the wiper 23 in frictional engagement with the plate of glass 2. The pressing action of the resilient end of the rock shaft will prevent rattling of the wiper arm 22 relative to the plate of glass 2 and also prevent the wiper 23 from riding over matter on the plate of glass 2 that would not be removed unless some pressure was brought to bear by the wiper against the plate of glass. I not only attach importance to the pressing action of the wiper, but more particularly to the rocking action of the same so that the wiper will have a self adjustment or may set itself at a proper angle for thoroughly wiping the face of the blade of glass.

Before describing other forms of my invention, I desire to direct attention to the long bearing sleeve 4 for the rock shaft 9, as this sleeve provides a substantial and practically non-wearing bearing for the rock shaft, in contradistinction to a short sleeve or the side walls of the frame 1. If the rock shaft simply had bearing in openings in the sides of the frame, the walls of such openings would wear and in a short while the rock shaft would wobble and rattle which is not a thing desired in connection with any windshield attachment or as a matter of fact any part of a vehicle. Insomuch that the bearing sleeve is firmly clamped, the crank 12 positively fixed to the rock shaft and the resilient end of the rock shaft producing pressure against the wiper arm, it is practically impossible for any parts of the wiping device to rattle.

Reference will now be had to Figs. 3 and 4 showing a two arm construction. In order that a wiper arm, generally designated 28 may be moved in unison with the wiper arm at the front side of the plate of glass 2, I provide another clamping member 29 similar to the clamping member 5 but detachable relative to the sleeve 4. The clamping member 29 is substituted for the washer 7, shown in Fig. 1, and the clamping member 29 is held in place, against the windshield frame, by the nut 8. To connect the crank 12 to the wiper arm 28 so that said wiper arm may be actuated in synchronism with the front wiper arm, I provide the crank 12 with a resilient extension member 30 which is pivotally attached to the wiper arm 28, as at 31. The extension member is sandwiched between the handle 16 and the head 14 and embraces the crank, as at 32, so that the extension member will be maintained in alinement with the crank and may at all times exert a pressure against the wiper arm 28, similar to the resilient end 18 of the rock shaft 9, and thus permit of both sides of the plate of glass 2 being cleaned by simply swinging the crank 12.

With some types of windshields it may not be permissible or convenient to mount a long bearing sleeve in the windshield frame, therefore I have provided a clamp which may be attached to a windshield frame to afford a long sleeve bearing for the rock shaft 9. This is shown in Figs. 5, 6, 9 and 10. The clamp comprises two members 33 and 34, the latter telescoping the former and having a liquid shedding top wall. The members 33 and 34 have a configuration, as at 35 which permits of said members embracing a windshield frame 36 made of tubing or the like, and the member 33 is cut and stamped to provide the depending lug 6, while the lower edge of the member 24 bears against the frame 36 and engages the plate glass 2. In the member 33 is a sleeve bearing 37 for the rock shaft 9 and said sleeve bearing protrudes through an opening 38 in the member 34 so that the nut 8 may be used for clamping the members 33 and 34 together and in engagement with the frame 36. The shape of the members 33 and 34 prevents any turning of the clamp on the frame 36 and said members afford a substantial support for other parts of the wiping device. It is obvious that this form of wiping device may be provided with a rear wiping arm as shown in Fig 3.

In all forms of my device the rock shaft affords one center about which the holder 24 swings and the pin 20 another center about which the arm 22 swings, these centers having a relative location which causes the holder to slide on the arm during operation of the device.

The wiping device may be made of light and durable metal, finished to harmonize with the frame of the windshield, and while in the drawings there are illustrated forms of my invention which have been put into practice, I would have it understood that the structural elements are susceptible to such changes, in size, shape and manner of assemblage as fall within the scope of the appended claims.

What I claim is:—

1. In a windshield wiping device wherein oscillatory wiper arms are adapted to be actuated from a rock shaft supported on a windshield frame:— a bearing for the rock shaft comprising a screwthreaded sleeve in which the shaft is journaled, a stamped clamping member at one end of said sleeve, said clamping member having an arcuate face, a perforated lug struck from the arcuate face of said clamping member and loosely supporting one of said wiper arms, another stamped clamping member on said sleeve having an arcuate face with an outstruck perforated lug to which the other wiper arm is loosely connected, and means on said sleeve screwthreaded for drawing said clamping members together and into clamping engagement with the windshield frame.

2. The combination, in a windshield cleaner, of a long sleeve bearing transversely of a windshield frame, a clamping member for attaching said long sleeve bearing to the windshield frame, a wiper arm loosely supported by said clamping member and adapted for swinging relative to the windshield frame, a holder pivotally supported from an end of said rock shaft and slidably engaging said arm for swinging said arm and pressing it against the windshield, said holder being channel shaped and having restricted portions bearing against said wiper arm to afford a minimum friction when sliding on said arm, and operating means for said rock shaft.

In testimony whereof I affix my signature in presence of two witnesses.

FRANK KRITZ.

Witnesses:
FRANK R. BAUER,
KARL H. BUTLER.